Jan. 23, 1968   TETSUO MAEDA   3,364,762
CHANGE SPEED GEAR CONTROL DEVICE FOR BICYCLES OR THE LIKE
Filed Nov. 4, 1964   7 Sheets-Sheet 1
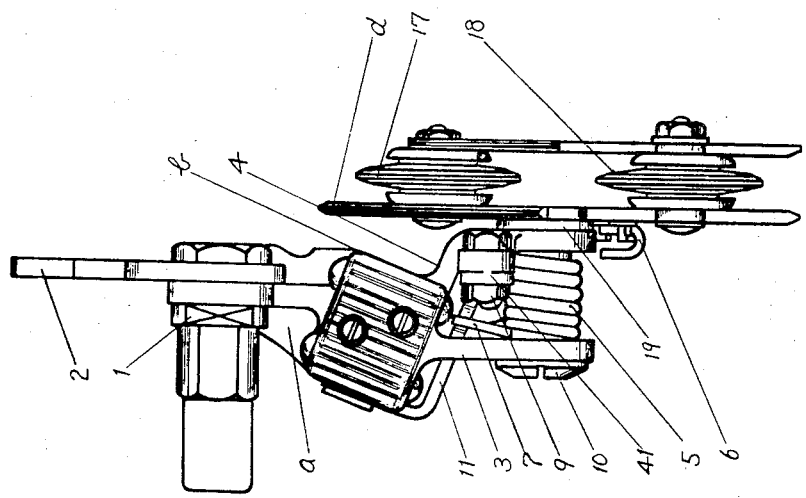
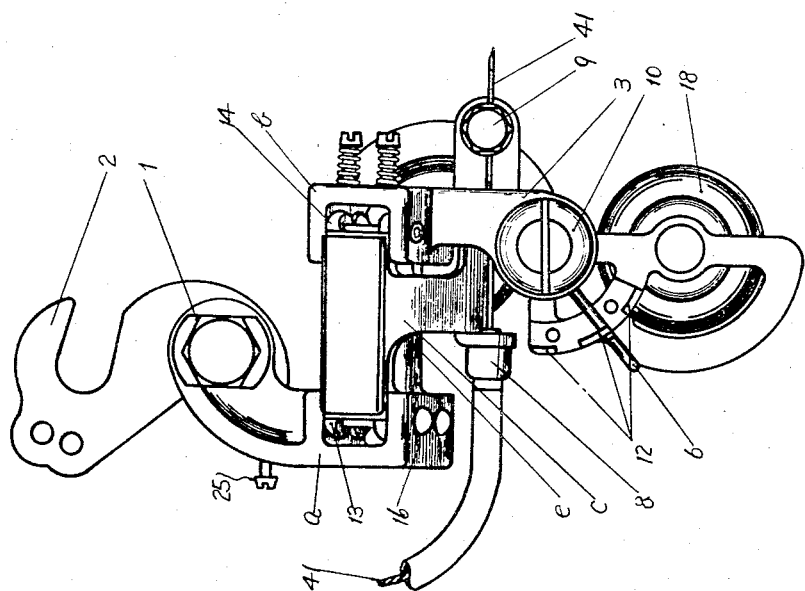
INVENTOR.
Tetsuo Maeda
BY
Attorney

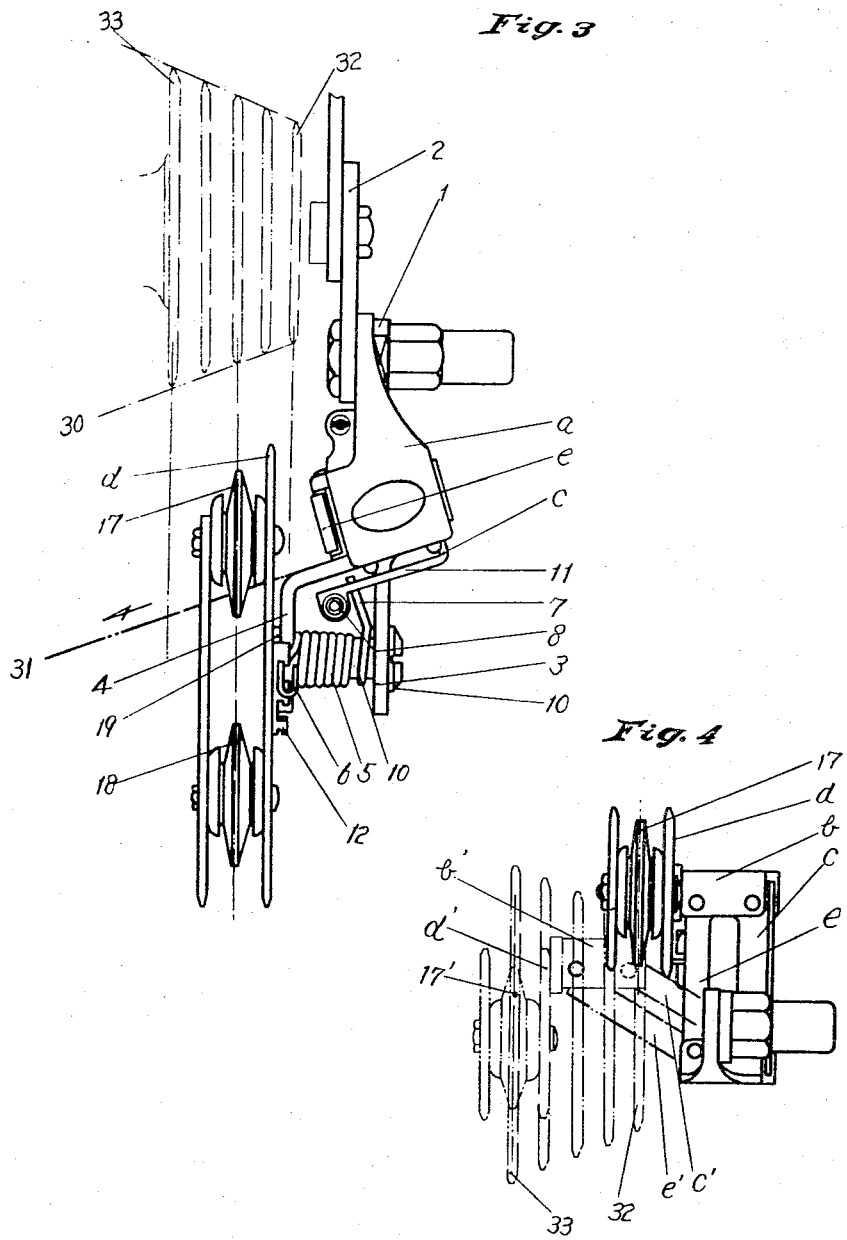

Jan. 23, 1968 TETSUO MAEDA 3,364,762
CHANGE SPEED GEAR CONTROL DEVICE FOR BICYCLES OR THE LIKE
Filed Nov. 4, 1964 7 Sheets-Sheet 4

INVENTOR.
Tetsuo Maeda
BY Ernest Montague
Attorney

Jan. 23, 1968 TETSUO MAEDA 3,364,762
CHANGE SPEED GEAR CONTROL DEVICE FOR BICYCLES OR THE LIKE
Filed Nov. 4, 1964 7 Sheets-Sheet 5
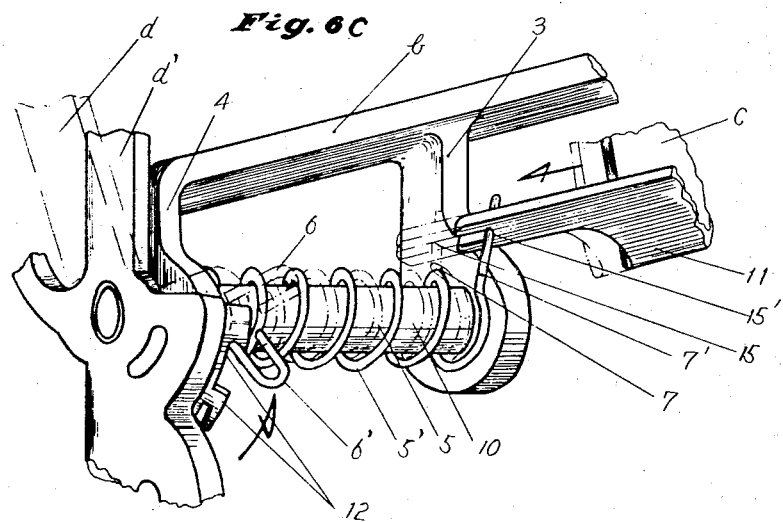
Fig. 6C
Fig. 7
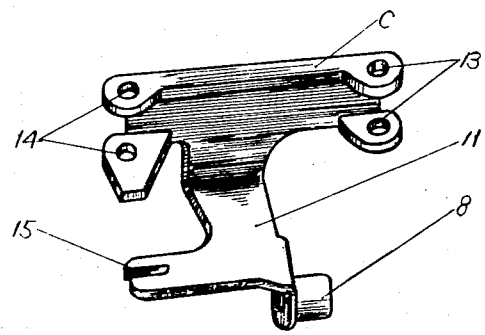
INVENTOR.
Tetsuo Maeda
BY
Ernest Montague
attorney

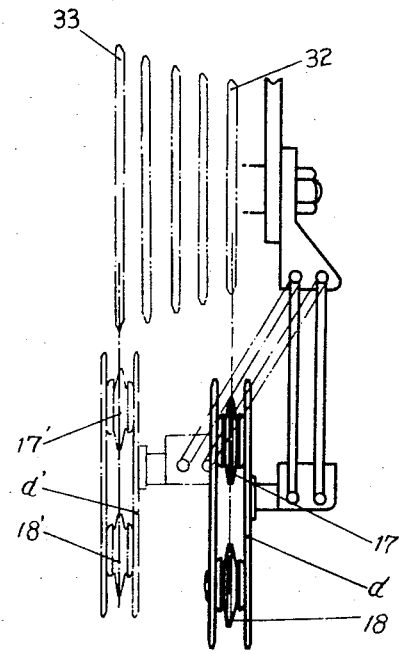
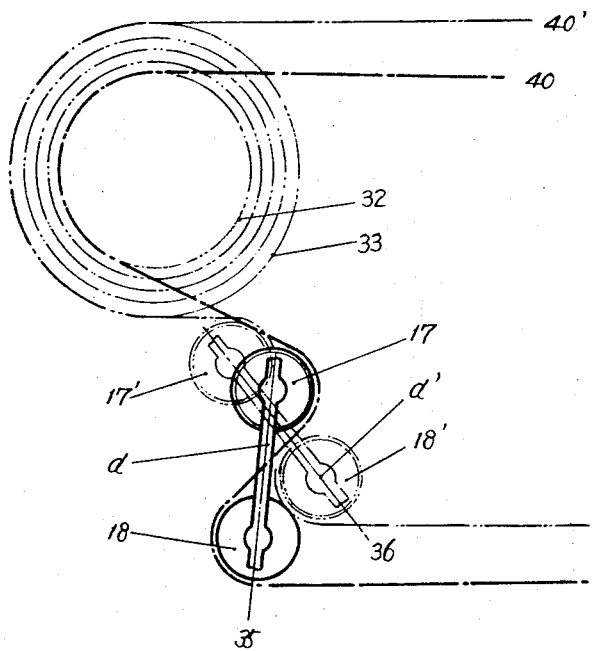

United States Patent Office 3,364,762
Patented Jan. 23, 1968

3,364,762
CHANGE SPEED GEAR CONTROL DEVICE FOR
BICYCLES OR THE LIKE
Tetsuo Maeda, 41, Nicho, Minami-koya-cho,
Sakai, Osaka, Japan
Filed Nov. 4, 1964, Ser. No. 409,021
Claims priority, application Japan, Oct. 7, 1964,
39/57,423
1 Claim. (Cl. 74—217)

The present invention relates to a change speed gear control device for bicycles.

It is one object of the present invention to provide a device which comprises a guide pulley, which moves parallel to a line connecting the lower brims of the respective change gears, so as to keep a constant space between the guide pulley and the gears, while the engaging space of the guide pulley and the respective change gears remains constant regardless of the different sizes of the change gears and, whenever the chain is strained by the spring over any one of the change gears, it is always given a proper tension and the reaction of the spring is utilized as a stabilizer for the convertor.

In the conventional outside change gears, the space between the guide pulley and the change gears of a smaller diameter is larger than the space between the change gears of a larger diameter and the guide pulley shifted beneath it, whereas the best relation between the change gears and the guide pulley is kept up whenever the space between them is kept constant, since the guide pulley in the outside change gear shifts directly below the desired gears. In this respect the conventional outside change gears have a shortcoming and the chain is irregularly put on the respective change gears, so that the speed of the bicycle cannot be smoothly changed.

It is another object of the present invention to provide a device which avoids such a shortcoming of the known structures.

With these and other objects in view, which will become apparent in the following detailed description, the present invention will be clearly understood in connection with the accompanying drawings, in which:

FIG. 1 is a rear elevation of the change gears, according to the present invention;

FIG. 2 is a right end view thereof;

FIG. 3 is a front elevation of the change gears shown in FIG. 1;

FIG. 4 is a top plan view thereof, showing the relation between the guide pulley and the respective change gears;

Figure 6A:
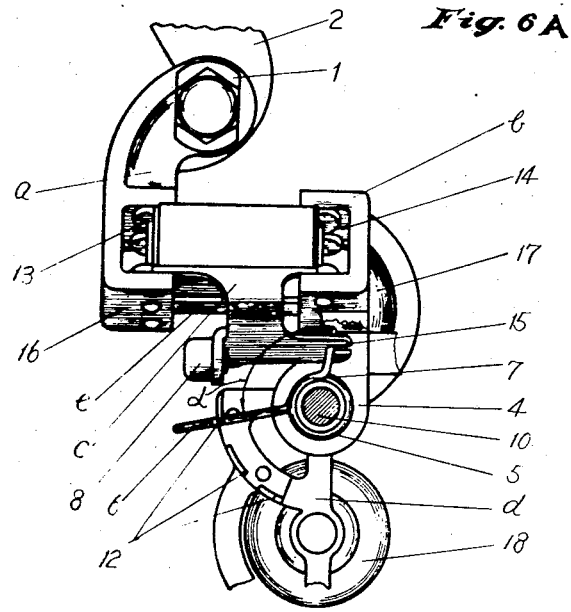
Figure 6B:
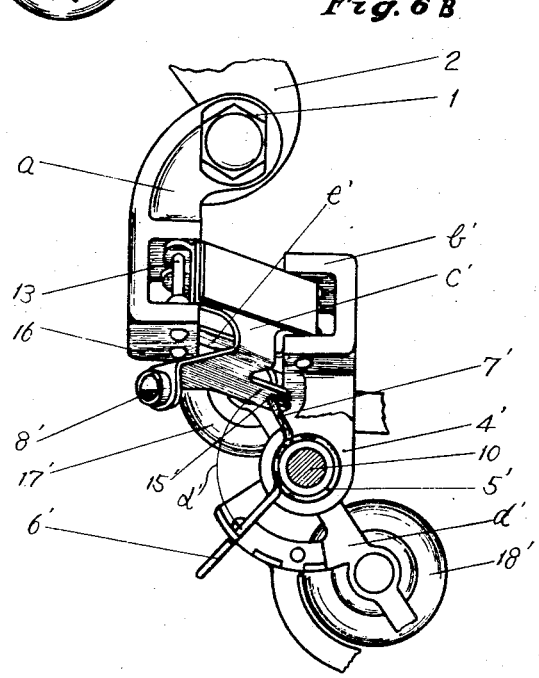
Figure 10:
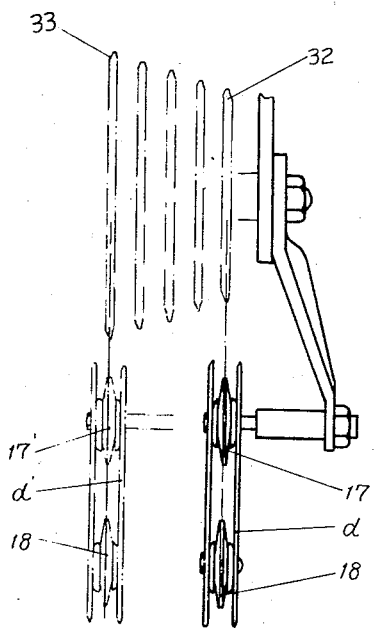
Figure 11:
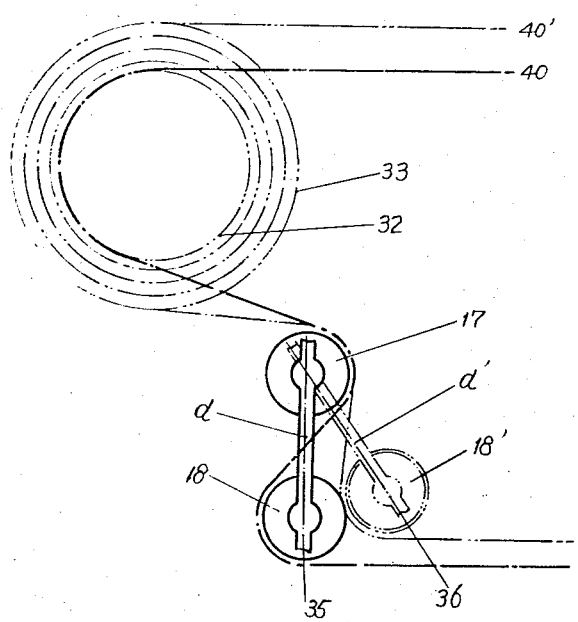

FIGS. 6A and B are right side views of the relative position of the spring in the condition of the change gears shown in FIG. 4;

FIG. 6C is a perspective rear view on the left side illustrating the movement of the spring in the condition shown in FIG. 6B;

FIG. 7 is a perspective view of the operation tool;

FIG. 8 is an elevational view of the structure of one example of the conventional outside change gears;

FIG. 9 is a right end view of the above-mentioned structure in FIG. 8;

FIG. 10 is a front elevation of the conventional outside change gears different from the one illustrated in FIGS. 8 and 9; and FIG. 11 is a view from the right side of the side change gears in the same condition as in FIG. 10.

Referring now to the drawings, and in particular to FIGS. 8 and 10, the space between the change gears of a smaller diameter 32 and the guide pulley 17 is greater than the space between the change gears of a larger diameter 33, which entails an irregularity in the condition of the spring strained over the respective change gears.

In FIGS. 9 and 11, which illustrate how the chain 40 is strained over the change gears 32 and 33, a spring works to turn the convertor clockwise, to prevent the slack of the chain 40. But, as one end of the spring which acts on the convertor $d$ is immovably inserted, the spring will be greatly tightened and strained, when the convertor $d$ turns to be in the position $d'$, so that the tension of the chain 40 cannot be constant. In addition, the space of the chain 40 which engages the change gears of the smallest diameter 32 and the change gears of the largest diameter 33 varies greatly. In order to carry out the most efficient speed change, the necessary space of engagement of the change gears and the chain 40 must be the shortest. In the conventional change gears, the best space of engagement for the change gears of the smallest diameter 32 is too long for the change gears of the largest diameter 33 or the best space for the largest diameter 33 is too short for the change gears of the smallest diameter 32. Thus it has been impossible to find out the space of engagement which will be equally suitable for a group of all the change gears. Attempts have been made to nearly fix this space. But, when the chain is put on the change gear of the smallest diameter, the guide pulley comes near the hub shaft, while it goes away when the chain is laid on the change gear of the largest diameter. In practice, however the slack of the chain is greater in the former case and reversely the slack is smaller in the latter case. For that reason, compared with the position wherein the chain is put on the change gears of the smallest diameter, the counter-clockwise angle of the convertor when the chain is laid on the change gear of the largest diameter becomes further greater than the angle made by the center-lines 35 and 36 of FIGS. 9 and 11 and the spring which acts on the convertor will be further tightened to double its tension, so that no smooth change in speed can be expected. It is essential that, regardless of the sizes of the change gears, the tension of the chain should remain constant.

Thus the conventional outside change gears have the following shortcomings:

(1) The space between the respective change gears and the guide pulley is not definitely fixed. Consequently the shifting of the chain from one change gear to the other cannot be carried out quickly.

(2) There is a great difference in the space of engagement between the chain and the respective change gears, and resistance is great when shifting the chain.

(3) The difference of tension of the chain, when it is put on the change gear of the smallest diameter and when the chain is put on the change gear of the largest diameter is great and, when the tension is weak the chain is liable to come off, while in case of its being strong, the running chain meets with resistance.

It has been practically impossible to meet all the above three requirements at the same time. If the first requirement be met, the second and third ones are neglected.

In view of the above-mentioned shortcomings of the conventional change gears, the change gears according to the present invention are designed such, that the guide pulley shifts parallel to the line connecting the lower brims of the respective change gears. In other words, a definite space is always kept between the guide pulley and the respective change gears, and also the space of engagement of the chain with the change gears is kept nearly definite regardless of the different sizes of the respective change gears, while by the use of one spring, a suitable tension is always given to the chain whichever change gear it is laid upon and the reaction of the spring is utilized as a stabilizer of the convertor at the same time.

One of the embodying examples of the present invention is as follows in connection with FIGS. 1 to 4:

A connecting part 16 which constitutes a part of the support *a* has a predetermined shape in its section and is at an angle with the horizontal direction. It is so formed as to incline in order to allow the guide pulley 17 to move along a line parallel to the line connecting the lower brims of a plurality of the change gears, and to the connecting part 16 is connected, with the aid of the operation tool *c* and the connecting rod *e*, the shifting body *b* which has a predetermined shape in its section and the inclination of the same angle as the above support *a*. With the support *a*, the operation tool *c*, the connecting rod *e*, and the shifting body *b*, a parallelogram, which can revolve freely, is formed.

On the lower part of the shifting body *b* are arranged the forked ends 3 and 4, through which are horizontally perforated the holes into which is pushed a pin 10 which forms the shaft for a spring 5, which is loosely laid on the pin 10 and, through the intermediary of a washer 19, the said spring 5 fastens the convertor *d* with the screw located in the center of the convertor *d*, so that the convertor *d* can vertically revolve, while keeping in touch with the shifting body *b*.

The operation tool *c* connects the support *a* and the shifting body *b* to revolve freely through the connecting parts 13 and 14, shown in FIG. 7. The operation tool *c* has the forked part 15 to catch one end 7 of the spring 5 and also the barrel 8 to receive the outer cable for operation. The inner cable 41 for operation which is put through the barrel 8 is led to a clamping bolt 9 arranged on the shifting body *b*.

The convertor *d* has a guide pulley 17 on its upper part, a tension pulley 18 on its lower part and a required number of catches 12 for the spring on its outside center part, respectively. Both the guide pulley 17 and tension pulley 18 can revolve freely.

Thus the support *a*, the shifting body *b*, the operation tool *c* and the connecting rod *e* form a parallelogram which inclines inwards, and a pin 10 is pushed through the piercing holes in the forked ends 3 and 4 in the lower part of the shifting body *b*, while the spring 5 is loosely put on the pin 10 and the convertor *d* is axially fixed to revolve freely. One end 6 of the spring 5 which is loosely fit on the pin 10 is fastened by the catch 12 on the convertor *d* and the other end 7 of the spring 5 is caught in the forked part 15 of the operation tool *c*, while the spring 5 is allowed to act.

The outside change gears according to the present invention can be used in the following manner:

With the aid of the fixture 2 and the bolt 1, the support *a* of the change gears is mounted in a suspensory condition on the hub shaft of the rear wheel of the bicycle, while the cable 41, connected to a lever (not illustrated) for speed change which is fixed to a suitable part of the bicycle body, with its position determined by the adjusting screw 25, is passed through the barrel 8 and fastened to the clamping bolt 9 arranged on the shifting body *b*. In this way, the line 30 which connects the lower brims of the respective change gears and the shifting direction 31 of the shifting body *b*, which is formed to slant downwards, run parallel with each other, as shown in FIG. 3.

Consequently, if the position of the shifting body *b* is changed by extending the cable 41, the shifting body *b* will shift obliquely downward, while as shown in FIG. 4, the shifting body *b* retreats from its position most advanced toward the running direction of the bicycle to the obliquely backward position. At the same time, the convertor *d* revolves around the pin 10. Thus the respective movements of both the shifting body *b* and convertor *d* cooperate to keep up the proper relation between the respective change gears and the guide pulley 17 at all times so that the chain can be easily laid on the required change gear. This is the first characteristic of the present invention to be noted.

Figure 5:
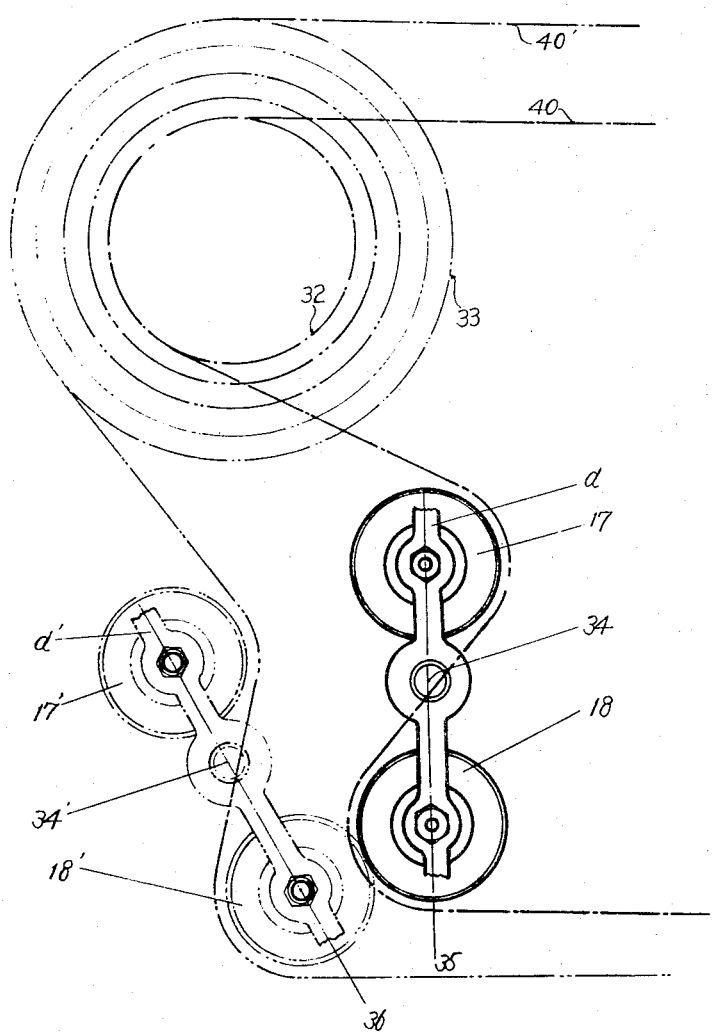
FIG. 5 illustrates the right end view thereof, indicating the above-mentioned relation.

As shown in FIG. 4, which is a plan view showing the relation between the guide pulley and the respective change gears, and FIG. 5 which illustrates a right end view of the mentioned relation, the engaging length between the change gear 32 of a smaller diameter and the chain 40, when the chain is laid on the change gear 32 of a smaller diameter, as the shifting body *b* moves from its most advanced position shown in solid lines in the drawings to its obliquely backward position *b'* and their like engaging length when the chain 40 is put on the change gear 33 of a larger diameter are greatly improved in comparison with the conventional outside change gears, as illustrated in FIGS. 9 and 11 and are always kept nearly the same, which is the second characteristic of the present invention.

Because of the difference in tension of the chain 40 when it is put on the change gears of different diameters, the chain 40 must always be strained properly by the tension pulley 18 provided beneath the guide pulley 17. In this respect, the outside change gears according to the present invention have the most satisfactory mechanism as follows:

When the chain 40 is put on the change gear 32 of the smallest diameter and then switching the chain 40 to the change gears of larger diameters in order, eventually to the change gear 33 of the largest diameter, the convertor *d*, the guide pulley 17 and the tension pulley 18 move from their positions 35 shown in solid lines in FIG. 5 to the position 36 illustrated in dotted lines. In other words, the convertor *d* turns counter-clockwise, with the center 34 of the pin 10 as its shaft, in order to give a proper tension to the chain 40 at all times. In order to keep the constantly equal tension of the chain 40 during its engagement with the respective change gears, the elastic strength of the spring itself which acts upon the convertor *d* must be kept constant at all times. This relation is illustrated in FIGS. 6A and B, which are right end views showing the relative position of the spring part, and FIG. 6C which is a perspective view seen from the left rear end and showing the movement of the spring, wherein if the convertor *d* is turned clockwise in order to strain the chain 40 when the one end 6 of the spring 5 is fixed to the fixing part 12 of the spring of the convertor *d*, while the chain 40 is engaged with the change gear 32 of the smallest diameter, and the other end 7 or the spring 5 is caught in the forked part 15 of the operation tool *c*, the end 7 of the spring 5 will react to revolve counterclockwise in opposition to the action of the other end 6 of the spring 5. This reaction of the end 7 of the spring 5 works to push the forked part 15 of the operation tool backwards (left side in FIG. 6A). This backward movement of the forked part 15 causes the shifting body *b*, which is connected to the operation tool *c*, to move inwards, acting to put the chain 40 on the change gear of the largest diameter.

On the other hand, if the cable 41 is stretched by returning the lever for changing the speed (not illustrated), the space between the forked part 15 and the shifting body *b* becomes larger by the action of the end 7 of the spring 5, which is caught in the forked part 15, to go backwards. Consequently the shifting body *b*, the convertor *d* and the guide pulley 17 move inwards and the chain 40 will be engaged with the change gear lying adjacent to the change gear 32 of the smallest diameter, in the event of which, the chain 40 slacks less than when it is engaged with the change gear 32 of the smallest diameter and the convertor *d* revolves counter-clockwise. Consequently the force of the end 7 of the spring 5 to move further backward (turning counter-clockwise in FIGS. 6A and 6B) increases to be equal to its action to push the forked part 15 backwards, when the chain 40 is laid on the change gear 32 of the smallest diameter.

In the same way, the chain 40 will be put on the respective change gears in turn and eventually it is laid on the changing gear 33 of the largest diameter. If this condition is compared with that of FIG. 6A, the angles formed by the center of the pin 10 and the fixing part 12 of the spring 5 are nearly the same, which means that the force of the spring 5 acting upon the tension pulley 18 through the convertor d remains always constant. And the chain 40 is oppositely put on the respective changing gears in turn from the changing gear 33 of the largest diameter to the changing gear 32 of the smallest diameter, when the lever for changing the speed is pulled to cause the respective parts to shift in the arrow direction of FIG. 6C. This is the third one of the major characteristics of the present invention. Thus the outside change gear for the bicycle according to the present invention solves completely the shortcoming of the conventional outside change gear and has a great practical use.

While a preferred embodiment of the invention has been shown and described, many modifications thereof can be made by one skilled in the art without departing from the spirit of the invention and it is desired to protect by Letters Patent all forms of the invention falling within the scope of the following claim.

What I claim is:

1. A change speed gear control device, for chain driven vehicles comprising
    a support including a connecting part disposed at an angle to the horizontal direction, and adapted to be mounted on the link shaft of the rear wheel of the vehicle,
    a convertor including a guide pulley and a tension pulley, as well as a plurality of catches,
    a plurality of change gears of increasing diameters adapted to receive a chain selectively,
    said connecting part being inclined to allow said guide pulley to move along a line disposed parallel to a line connecting the lower brims of said plurality of change gears,
    an operation tool and a connecting rod,
    a shifting body connected with said connecting part by means of said operation tool, and said connecting rod,
    said shifting body being disposed at said angle to the horizontal direction as said support,
    said support, said operation tool, said connecting rod and said shifting body defining jointly a freely revolving parallelogram,
    said shifting body having forked ends having holes,
    a pin received in said holes,
    a helical spring mounted on said pin,
    said convertor including a screw in the center thereof,
    said spring fastening said convertor to said shifting body, and permitting revolving of said convertor,
    one end of said spring being connected with said operation tool,
    the latter having a barrel receiving a cable, the other end of said spring being connected with one of said catches,
    the position of said shifting body being utilized as a stabilizer by reaction of the stretching action of said spring in order to stretch said chain,
    a sheath member enclosing said cable and having an end secured to said barrel,
    said shifting body including a clamping bolt,
    said cable extending through said barrel to said clamping bolt and clamped thereto, and
    said shifting body, upon displacement of said cable in said sheath, shifting obliquely downwardly.

References Cited

UNITED STATES PATENTS 3,181,383    5/1965    July _____ 74—217

FOREIGN PATENTS 1,346,243    11/1963    France.
 701,135    12/1953    Great Britain.
 737,533    9/1955    Great Britain.
 878,199    9/1961    Great Britain.
 413,362    4/1946    Italy.

FRED C. MATTERN, Jr., *Primary Examiner.*

DAVID J. WILLIAMOWSKY, *Examiner.*

J. A. WONG, *Assistant Examiner.*